(12) United States Patent
Fujino et al.

(10) Patent No.: US 7,600,546 B2
(45) Date of Patent: *Oct. 13, 2009

(54) PNEUMATIC TIRE COMPRISING AN INNERLINER (75) Inventors: Kentaro Fujino, Tokyo (JP); Shinji Tai, Tokyo (JP); Kaoru Ikeda, Kurashiki (JP); Tomoyuki Watanabe, Kurashiki (JP); Kouta Isoyama, Kurashiki (JP)

(73) Assignees: Bridgestone Corporation, Tokyo (JP); Kuraray Co., Ltd., Kurashiki-shi (JP)

( * ) Notice: Subject to any disclaimer, the term of this patent is extended or adjusted under 35 U.S.C. 154(b) by 510 days.

This patent is subject to a terminal disclaimer.

(21) Appl. No.: 10/692,950

(22) Filed: Oct. 27, 2003

(65) Prior Publication Data

US 2004/0089388 A1    May 13, 2004

(30) Foreign Application Priority Data

Nov. 13, 2002   (JP)   ............... 2002-329149

(51) Int. Cl.
B60C 5/14   (2006.01)

(52) U.S. Cl. ............... 152/510; 152/DIG. 16

(58) Field of Classification Search ............. 152/510; 525/58, 61
See application file for complete search history.

(56) References Cited

U.S. PATENT DOCUMENTS

| | | | |
|---|---|---|---|
| 2,434,179 A * | 1/1948 | Sharkey | ............ 525/60 |
| 3,025,267 A | 3/1962 | John et al. | |
| 3,542,902 A * | 11/1970 | Tsukamoto et al. | ............ 525/58 |
| 3,707,567 A | 12/1972 | Frank et al. | |
| 4,619,849 A * | 10/1986 | Anzawa et al. | ............ 206/524.6 |
| 5,153,262 A | 10/1992 | Beers | |
| 5,280,817 A * | 1/1994 | Liu et al. | ............ 152/454 |
| 5,292,590 A * | 3/1994 | Lin et al. | ............ 428/494 |
| 5,879,488 A * | 3/1999 | Weston et al. | ............ 156/64 |
| 6,479,160 B1 * | 11/2002 | Tsai et al. | ............ 428/474.4 |
| 2004/0096683 A1 | 5/2004 | Ikeda et al. | |

FOREIGN PATENT DOCUMENTS

| | | |
|---|---|---|
| EP | 0 774 340 | 5/1997 |
| EP | 1 090 932 A1 | 4/2001 |
| EP | 1090932 A1 | 4/2001 |
| GB | 958893 | 5/1964 |
| JP | 49-016279 B | 4/1974 |

(Continued)

OTHER PUBLICATIONS

U.S. Appl. No. 11/813,840, filed Jul. 12, 2007, Isoyama et al.

(Continued)

Primary Examiner—Geoffrey L Knable
(74) Attorney, Agent, or Firm—Oblon, Spivak, McClelland, Maier & Neustadt, L.L.P.

(57) ABSTRACT

Disclosed is an innerliner for pneumatic tires, wherein the innerliner comprises a modified ethylene-vinyl alcohol copolymer (C) obtained by reacting 1-50 parts by weight of an epoxy compound (B) with 100 parts by weight of an ethylene-vinyl alcohol copolymer (A) having an ethylene content of 25-50 mol %. A pneumatic tire with the innerliner can greatly improve the internal pressure retainabilities before and after driving without increasing the weight of the tire.

11 Claims, 1 Drawing Sheet

FOREIGN PATENT DOCUMENTS

| | | |
|---|---|---|
| JP | 53-35993 B | 9/1978 |
| JP | 60-197704 | 10/1985 |
| JP | 63-8448 | 1/1988 |
| JP | 03-88837 A * | 4/1991 |
| JP | 3-227307 | 10/1991 |
| JP | 05-320330 A | 12/1993 |
| JP | 6-40207 | 2/1994 |
| JP | 07-331020 A * | 12/1995 |
| JP | 2002-52904 | 2/2002 |
| JP | 2002-79804 | 3/2002 |
| WO | WO00/56780 A | 9/2000 |
| WO | WO 02/092643 A1 | 11/2002 |
| WO | WO 03/072653 A1 | 9/2003 |

OTHER PUBLICATIONS

U.S. Appl. No. 12/297,472, filed Oct. 17, 2008, Ikeda, et al.

* cited by examiner

Fig. 1

PNEUMATIC TIRE COMPRISING AN INNERLINER

BACKGROUND OF THE INVENTION

The invention described herein is based on a Joint Research Agreement between Bridgestone Corporation and Kuraray Co., Ltd.

1. Field of the Invention

The present invention relates to an innerliner for pneumatic tires which is superior both in gas barrier property and in flexing resistance. Furthermore, the present invention relates also to a tire using the above-mentioned innerliner and to a technology of improving the internal pressure retainability before use and after driving without increasing the weight of the tire.

2. Description of the Related Art

For the purpose of retaining the internal pressure of tires, a butyl rubber, a halogenated butyl rubber and the like are used conventionally as a major raw material of an innerliner as an air barrier layer. However, innerliners made of rubber compositions containing those rubbers are required to have a thickness of about 1 mm because of poor gas barrier properties of the rubber compositions. An innerliner, therefore, accounts for about 5% by weight of a tire. This inhibits the improvement of automobile fuel efficiency through weight reduction of tires.

On the other hand, ethylene-vinyl alcohol copolymers, which henceforth may be abbreviated as EVOH, are known to be superior in gas barrier property. EVOH has an air transmission rate of not more than $1/100$ that of a butyl-based innerliner rubber composition. It, therefore, can greatly improve the internal pressure retainability even if it has a thickness of 50 μm or less. In addition, it can reduce the weight of a tire. There are many resins having an air transmission rate smaller than that of a butyl rubber. However, when a resin has an air transmission rate of about $1/10$ that of butyl-based innerliners, only a small effect of improving the internal pressure retainability is achieved unless the thickness thereof is over 100 μm. When the thickness of the resin is over 100 μm, a small effect of reducing the tire weight is achieved and a rupture or crack is generated in an innerliner from its deformation occurring during the flexure of a tire. It, therefore, becomes difficult to retain the barrier property. On the other hand, because EVOH can be used even in a thickness of 50 μm or less, use of such thin EVOH will make a rupture or crack hard to be generated even if it is flexurally deformed during rotation of a tire. The use of EVOH for a tire innerliner, therefore, is effective for improving the air permeability of a pneumatic tire. As a pneumatic tire having a tire innerliner made of EVOH, known is a technology disclosed in JP-A-6-40207.

Use of a normal EVOH as an innerliner results in a great effect of improving the internal pressure retainability. However, the normal EVOH has an elastic modulus extremely higher than those of rubbers usually used for tires. Therefore, a rupture or crack may be generated in the innerliner due to its deformation caused by its flexure. For such reasons, when an innerliner made of EVOH is used, although the internal pressure retainability of a tire before use is greatly improved, the internal pressure retainability of a tire after use, which was applied with flexural deformation during the rotation of the tire, may be worsened than that before use. In order to solve this problem, disclosed is an innerliner for an inner surface of a tire which comprises a resin composition comprising from 60-99% by weight of an ethylene-vinyl alcohol copolymer having an ethylene content of from 20-70 mol % and a degree of saponification of 85% or more and from 1-40% by weight of a hydrophobic plasticizer (JP-A-2002-52904).

In late years, however, innerliners having a higher flexing resistance than conventional tire innerliners made of EVOH while maintaining the gas barrier property are coming to be required. Hence, further improvement in technology has been expected.

SUMMARY OF THE INVENTION

An object of the present invention is to provide an innerliner for pneumatic tires which is superior in gas barrier property and flexing resistance.

Another object of the present invention is to provide a pneumatic tire having greatly improved internal pressure retainabilities before and after driving through an improvement of the internal pressure retaining technology such as an innerliner.

Above problems are solved by an innerliner for pneumatic tires, wherein the innerliner comprises a modified ethylene-vinyl alcohol copolymer (C) obtained by reacting 1-50 parts by weight of an epoxy compound (B) with 100 parts by weight of an ethylene-vinyl alcohol copolymer (A) having an ethylene content of 25-50 mol %.

In a preferable embodiment, the epoxy compound (B) is glycidol or epoxypropane.

In a preferable embodiment, the ethylene-vinyl alcohol copolymer (A) has a degree of saponification of 90% or more.

In a preferable embodiment, the layer of the modified ethylene-vinyl alcohol copolymer (C) has an oxygen transmission rate at 20° C. and at 65% RH of $3.0 \times 10^{-12}$ cm$^3$·cm/cm$^2$·sec·cmHg or less.

In a preferable embodiment, the modified ethylene-vinyl alcohol copolymer (C) in the innerliner is crosslinked.

In a preferable embodiment, the thickness of the layer of the modified ethylene-vinyl alcohol copolymer (C) is 50 μm or less.

In a preferable embodiment, the innerliner further comprises an auxiliary layer (D) of an elastomer adjacent to the layer of the modified ethylene-vinyl alcohol copolymer (C).

In a preferable embodiment, the layer of the modified ethylene-vinyl alcohol copolymer (C) is laminated with the auxiliary layer (D) through at least one adhesive layer.

In a preferable embodiment, the auxiliary layer (D) has an oxygen transmission rate at 20° C. and at 65% RH of $3.0 \times 10^{-9}$ cm$^3$·cm/cm$^2$·sec·cmHg or less.

In a preferable embodiment, a butyl rubber or a halogenated butyl rubber is used in the auxiliary layer (D).

In a preferable embodiment, a diene-based elastomer is used in the auxiliary layer (D).

In a preferable embodiment, a thermoplastic urethane-based elastomer is used in the auxiliary layer (D).

In a preferable embodiment, in the auxiliary layer (D), different auxiliary layers are laminated through at least one adhesive layer.

In a preferable embodiment, the auxiliary layer (D) has a thickness of 50-1500 μm in total.

Moreover, the problems previously mentioned are solved by a pneumatic tire comprising any of the innerliners mentioned above.

In a preferable embodiment, a pneumatic tire includes a bead portion, a side portion, a tread portion, a carcass and a belt.

In a preferable embodiment, the pneumatic tire is in a condition where the auxiliary layer (D) is designed so that in a region from the end of each belt to a bead portion, a portion of the auxiliary layer (D) corresponding to a width of at least 30 mm in the radius direction is thicker by at least 0.2 mm than a portion of the auxiliary layer (D) corresponding to a portion of the auxiliary layer (D) under the belt.

The innerliner of the present invention for pneumatic tires is superior both in gas barrier property and in flexing resistance. In addition, a pneumatic tire using the innerliner can greatly improve the internal pressure retainabilities before and after driving without increasing the weight of the tire.

DESCRIPTION OF THE PREFERRED EMBODIMENTS

The innerliner for pneumatic tires of the present invention includes a layer of a modified ethylene-vinyl alcohol copolymer (C) obtained by reacting an epoxy compound (B) with an ethylene-vinyl alcohol copolymer (A). The modification using the epoxy compound (B) in the present invention can reduce the elastic modulus of the ethylene-vinyl alcohol copolymer greatly, thereby improving the rupture property and the degree of generation of cracks at a time or flexing.

The ethylene-vinyl alcohol copolymer (A) for use in the present invention must have an ethylene content of 25-50 mol %. From the viewpoint of obtaining a superior flexing resistance and a superior fatigue resistance, the lower limit of the ethylene content is more preferably not less than 30 mol %, and still more preferably not less than 35 mol %. Moreover, from the viewpoint of gas barrier property, the upper limit of the ethylene content is more preferably not more than 48 mol %, and still more preferably not more than 45 mol %. When the ethylene content is less than 25 mol %, the flexing resistance and the fatigue resistance may be deteriorated. In addition, the melt moldability may also be worsened. On the other hand, when the ethylene content exceeds 50 mol %, the gas barrier property may be insufficient.

Furthermore, the ethylene-vinyl alcohol copolymer (A) for use in the present invention preferably has a degree of saponification of 90% or more. The degree of saponification is more preferably not less than 95%, still more preferably not less than 98%, and optimally not less than 99%. If the degree of saponification is less than 90%, the gas barrier property and the thermostability during the forming of an innerliner may become insufficient.

A preferable melt flow rate (MFR) (measured at 190° C. under a load of 2160 g) of the ethylene-vinyl acetate copolymer (A) for use in the present invention is 0.1-30 g/10 min, and more preferably 0.3-25 g/10 min. It is noted that for an ethylene-vinyl alcohol copolymer (A) having a melting point around or over 190° C., the value of MFR is represented by extrapolation at 190° C. in a semi-logarithmic graph, measuring MFRs at plural temperatures above the melting point under a load of 2160 g and plotting reciprocal numbers of the absolute temperatures on the abscissa and logarithms of the MFRs on the ordinate.

The innerliner for pneumatic tires of the present invention comprises a modified ethylene-vinyl alcohol copolymer (C) obtained by reacting 1-50 parts by weight of an epoxy compound (B) with 100 parts by weight of an ethylene-vinyl alcohol copolymer (A). With respect to the mixing ratio of (B) to (A), (B) is preferably used in an amount of 2-40 parts by weight for 100 parts by weight of (A), and more preferably in an amount of 5-35 parts by weight for 100 parts by weight of (A).

The method for producing the modified ethylene-vinyl alcohol copolymer (C) by reacting the ethylene-vinyl alcohol copolymer (A) with the epoxy compound (B) is not particularly restricted. A preferred example thereof is a method in which the ethylene-vinyl alcohol copolymer (A) is reacted with the epoxy compound (B) in a solution.

In the method using a solution reaction, the modified ethylene-vinyl alcohol copolymer (C) is obtained by reacting the epoxy compound (B) with a solution of the ethylene-vinyl alcohol copolymer (A) in the presence of an acid catalyst or an alkali catalyst. As the reaction solvent, preferred are polar aprotic solvents, which are good solvents of the ethylene-vinyl alcohol copolymer (A), such as dimethylsulfoxide, dimethylformamide, dimethylacetamide and N-methylpyrrolidone. The reaction catalyst includes acid catalysts such as p-toluenesulfonic acid, methanesulfonic acid, trifluoromethane sulfonic acid, sulfuric acid and boron trifluoride and alkali catalysts such as sodium hydroxide, potassium hydroxide, lithium hydroxide and sodium methoxide.

Among these, acid catalysts are preferably employed. A suitable amount of the catalyst is appropriately 0.0001-10 parts by weight for 100 parts by weight of the ethylene-vinyl alcohol copolymer (A). It is also possible to produce the modified ethylene-vinyl alcohol copolymer (C) by dissolving the ethylene-vinyl alcohol copolymer (A) and the epoxy compound (B) in a reaction solvent and then heating the solution.

The epoxy compound (B) for use in the present invention is not particularly restricted, but it preferably is a monofunctional epoxy compound. If the epoxy compound (B) is an epoxy compound with two or more functionalities, a crosslinking reaction with the ethylene-vinyl alcohol copolymer (A) may occur to deteriorate the quality of the innerliner for pneumatic tires due to generation of gels, pimples and the like. From the viewpoints of ease of production, gas barrier property, flexing resistance and fatigue resistance of the modified ethylene-vinyl alcohol copolymer (C), glycidol and epoxypropane are provided as examples of desirable monofunctional epoxy compounds.

The melt flow rate (MFR) (at 190° C. under a load of 2160 g) of the modified ethylene-vinyl alcohol copolymer (C) for use in the present invention is not particularly restricted. However, from the viewpoint of obtaining a superior gas barrier property, a superior flexing resistance and a superior fatigue resistance, the melt flow rate (MFR) of the modified ethylene-vinyl alcohol copolymer (C) is preferably 0.1-30 g/10 min, more preferably 0.3-25 g/10 min, and still more preferably 0.5-20 g/10 min. It is noted that for a modified EVOH having a melting point around or over 190° C., the value of MFR is represented by extrapolation at 190° C. in a semi-logarithmic graph, measuring MFRs at plural temperatures above the melting point under a load of 2160 g and plotting reciprocal numbers of the absolute temperatures on the abscissa and logarithms of MFRs on the ordinate.

The layer of the modified ethylene-vinyl alcohol copolymer (C) in the innerliner of the present invention for pneumatic tires preferably has an oxygen transmission rate at 20° C. and 65% RH of not more than $3.0 \times 10^{-12}$ cm$^3$·cm/cm$^2$·sec·cmHg, more preferably not more than $1.0 \times 10^{-12}$ cm$^3$·cm/cm$^2$·sec·cmHg, and still more preferably not more than $5.0 \times 10^{-13}$ cm$^3$·cm/cm$^2$·sec·cmHg.

The modified ethylene-vinyl alcohol copolymer (C) for use in the present invention is formed into a film, sheet or the like by melt forming in order to be used as an innerliner for pneumatic tires. The method for melt forming the film, sheet or the like may be extrusion forming and the like. The method of extrusion forming is not particularly restricted and may be the T-die method and the inflation method. The melting temperature varies depending on the melting point of the copolymer, but preferably about 150-270° C.

In the innerliner of the present invention, it is preferable that the modified ethylene-vinyl alcohol copolymer (C) in the layer of the copolymer be crosslinked. If the modified ethylene-vinyl alcohol copolymer (C) is not crosslinked, a layer of the modified ethylene-vinyl alcohol copolymer (C) may deform seriously in a vulcanization process for producing a pneumatic tire to be unable to keep the layer uniform. As a result, the gas barrier property, flexing resistance and fatigue resistance of an innerliner may be worsened.

The method for forming a crosslinked structure in the modified ethylene-vinyl alcohol copolymer (C) is not particularly restricted, but a preferable method is a method using irradiation with energy rays. Examples of the energy rays include ionizing radiations such as ultraviolet rays, electron beam, X-rays, $\alpha$-rays and $\gamma$-rays. The electron beam is preferred.

An example of the method of electron beam irradiation is a method comprising the steps of processing the copolymer (C) into a film or sheet by extrusion forming, and introducing the resulting article into an electron beam irradiation apparatus to irradiate with an electron beam. The amount of the electron beam applied is not limited particularly, but it is preferably within the range of 10-60 Mrad. If the amount of the electron beam applied is less than 10 Mrad, the crosslinking will become hard to proceed. On the other hand, if the amount of the electron beam applied exceeds 60 Mrad, deterioration of the formed article will proceed easily. It is more preferable that the amount of the electron beam be within the range of 20-50 Mrad.

The innerliner of the present invention can be used for pneumatic tires in the form of a monolayer article and also can be used for pneumatic tires in the form of a multilayer structure having at least one layer of the modified ethylene-vinyl alcohol copolymers (C). The innerliner of the present invention preferably has an auxiliary layer (D) of an elastomer adjacent to the layer of the modified ethylene-vinyl alcohol copolymer (C).

Moreover, in the innerliner for pneumatic tires of the present invention, the layer of the modified ethylene-vinyl alcohol copolymer (C) is laminated with the auxiliary layer (D) of the elastomer through at least one adhesive layer.

It is relatively easy to secure adhesion of an ethylene-vinyl alcohol copolymer to rubber because the copolymer has an —OH group. For example, when a chlorinated rubber-isocyanate based adhesive is used for an adhesive layer, adhesion to rubber compositions used in tires can be secured.

The layer constitution of the multilayer structure may be, but is not limited to, C/D1, D1/C/D1, C/Ad/D1, D1/Ad/C/Ad/D1, D1/C/D1/D2/ and D1/C/D1/Ad/D2 wherein a layer of the modified ethylene-vinyl alcohol copolymer (C) of the present invention is represented by C, auxiliary layers (D) of an elastomer are represented by D1 and D2, and an adhesive layer is represented by Ad. D1 and D2 denote auxiliary layers one of which comprises an elastomer different from that of the other. Each layer may be composed of a single layer. Alternatively, it may have multiple layers depending on circumstances. Moreover, with respect to the modified ethylene-vinyl alcohol copolymer (C), elastomer and adhesive layer to be used, they may be of one kind or alternatively of multiple kinds depending on circumstances.

The method of producing the multilayer structure is not specifically restricted. For example, there may be employed a method comprising melt extrusion of an elastomer and an adhesive layer on a formed article (film, sheet, etc.) of a modified ethylene-vinyl alcohol copolymer (C), a method comprising melt extrusion of a modified ethylene-vinyl alcohol copolymer (C) and an adhesive layer on an elastomer substrate, a method comprising co-extrusion of a modified ethylene-vinyl alcohol copolymers (C) and an auxiliary layer (D) (and an adhesive layer, as necessary), a method comprising lamination of a formed article obtained from a modified ethylene-vinyl alcohol copolymer (C) with a film or sheet of an elastomer through an adhesive layer, and a method comprising lamination of a formed article obtained from a modified ethylene-vinyl alcohol copolymer (C) with an auxiliary layer (D) (and an adhesive layer, as necessary) on a drum during the molding of a tire.

In the innerliner for pneumatic tires of the present invention, the thickness of the layer of the modified ethylene-vinyl alcohol copolymer (C) is preferably 50 µm or less. When the thickness of the layer is over 50 µm, the merit of weight reduction compared to the conventional innerliners made of butyl rubber, halogenated butyl rubber or the like become small. Furthermore, the layer of the modified ethylene-vinyl alcohol copolymer (C) may have a reduced flexing resistance and a reduced fatigue resistance, so that the layer will be liable to rupture or cracks caused through flexural deformation during rotation of a tire and the cracks formed will be easy to grow. Therefore, the internal pressure retainability after use of a tire may be lowered in comparison with that before use. On the other hand, the layer of the modified ethylene-vinyl alcohol copolymer (C) preferably has a thickness of 0.1 µm or more from the viewpoint of the gas barrier property of the innerliner for pneumatic tires. In view of gas barrier property, flexing resistance and fatigue resistance, the thickness of the layer of the modified ethylene-vinyl alcohol copolymer (C) is more preferably 1-40 µm, and still more preferably 5-30 µm.

As described above, when the layer of the modified ethylene-vinyl alcohol copolymer (C) is used in a thickness of not more than 50 µm, the flexing resistance and the fatigue resistance are improved and, therefore, the layer becomes resistant to rupture and cracks under flexural deformation during rotation of a tire. In addition, even if the layer of the modified ethylene-vinyl alcohol copolymer (C) is ruptured, the layer is resistant to peeling off from the auxiliary layer (D) of an elastomer because of its superior adhesiveness to the auxiliary layer (D), and is resistant to growth of cracks. The layer of the modified ethylene-vinyl alcohol copolymer (C), therefore, suffers from neither large rupture nor large crack. Furthermore, even if a rupture or crack is formed, the internal pressure can be retained well even after use of a tire because the auxiliary layer (D) makes up the rupture or crack formed in the layer of the modified ethylene-vinyl alcohol copolymer (C).

In other words, a pinhole, crack or the like may be formed even in a layer of the modified ethylene-vinyl alcohol copolymer (C) having a thickness of not more than 50 µm. Even in such a case, the growth of the crack can be inhibited by disposing an auxiliary layer (D) of an elastomer between a film layer and a ply layer located outside the film layer. Moreover, even if a crack may be formed, the surface of the auxiliary layer (D) is almost covered with a film of the modified ethylene-vinyl alcohol layer (C) because the layer of the modified ethylene-vinyl alcohol layer (C) is adhered firmly to a surface of the auxiliary layer (D). The leakage of air through the crack, therefore, can be inhibited by use of an elastomer having a low air peamiability (e.g., butyl rubber and halogenated butyl rubber) for the auxiliary layer (D).

The auxiliary layer (D) of an elastomer in the innerliner for pneumatic tires of the present invention preferably has an oxygen transmission rate at 20° C. and at 65% RH of $3.0 \times 10^{-9}$ cm³·cm/cm²·sec·cmHg or less, more preferably $1.0 \times 10^{-9}$ cm³·cm/cm²·sec·cmHg or less from the viewpoint of the gas barrier property of the innerliner.

Butyl rubber and diene-based elastomer are provided as examples of preferable elastomer to be laminated as the auxiliary layer (D) in the inner layer of the present invention. Preferable examples of the diene-based elastomer include natural rubber and butadiene rubber. From the viewpoint of gas barrier property, it is preferable to use a butyl rubber as the elastomer. Use of a halogenated butyl rubber is more preferable. In addition, from the viewpoint of inhibition of growth of cracks which were formed in the auxiliary layer (D) of an elastomer, it is preferable to use a composition comprising a butyl rubber and a diene-based elastomer as the elastomer. Use of such a composition as the elastomer can keep excellent internal pressure retainability of pneumatic tires after driving, even in the case where minor cracks are formed in the auxiliary layer (D) of the elastomer.

Thermoplastic urethane-based elastomer is also provided as an example of preferable elastomer to be laminated as the auxiliary layer (D) in the innerliner for pneumatic tires of the present invention. From the viewpoint of reduction of the thickness of the auxiliary layer (D) and inhibition of both generation and growth of cracks, it is preferable to use thermoplastic urethane-based elastomer.

It is more preferable to laminate an auxiliary layer (D) of a thermoplastic urethane-based elastomer and an auxiliary layer (D) of a composition comprising a butyl rubber and a diene-based elastomer as the elastomer layers to be laminated as the auxiliary layer (D) in the innerliner of the present invention.

In the innerliner of the present invention, the auxiliary layer (D) has a thickness of 50-1500 μm in total. If the total thickness of the auxiliary layer (D) of an elastomer is less than 50 μm, the innerliner has a reduced flexing resistance and a reduced fatigue resistance, so that the innerliner will be liable to rupture or cracks caused through flexural deformation during rotation of a tire and the cracks formed will be easy to grow. Therefore, the internal pressure retainability after use of a tire may decrease greatly in comparison to that before use. Furthermore, it is difficult to reduce the total thickness of the auxiliary rubber layer under a belt to less than 50 μm for technical reasons in the production of tires.

On the other hand, if the total thickness of the auxiliary layer (D) of an elastomer is over 1500 μm, only small weight reduction merit can be enjoyed over pneumatic tires used today. From the viewpoint of the gas barrier property, flexing resistance, fatigue resistance of an innerliner and weight reduction of a pneumatic tire, the total thickness of the auxiliary layer (D) of an elastomer is more preferably 100-1000 μm, and still more preferably 300-800 μm.

The rupture and cracks are formed mainly in a side portion of a tire, which portion exhibits a large flexural deformation. It, therefore, is possible to achieve both a good internal pressure retainability after driving and a good weight reduction of tires simultaneously through increase in thickness of the auxiliary layer only in the side portion.

In the innerliner of the present invention, the auxiliary layer (D) of an elastomer preferably has a 300% modulus of not more than 10 MPa for the purpose of inhibiting generation and growth of cracks. A 300% modulus over 10 MPa may result in reduction in flexing resistance and fatigue resistance of an innerliner. The auxiliary layer (D) preferably has a 300% modulus of not more than 8 MPa, and more preferably not more than 7 MPa.

The pneumatic tire of the present invention is provided by using the above-mentioned innerliner including a layer of the modified ethylene-vinyl alcohol copolymer (C).

The pneumatic tire of the present invention preferably includes a bead portion, a side portion, a tread portion, a carcuss and a belt.

The pneumatic tire of the present invention preferably has an auxiliary layer (D) which is designed so that in a region from the end of each belt to a bead portion, a portion of the auxiliary layer (D) corresponding to a width of at least 30 mm in the radius direction is thicker by at least 0.2 mm than a portion of the auxiliary layer (D) corresponding to a portion of the auxiliary layer (D) under the belt.

EXAMPLES

The present invention will be described in more detail with reference to the following examples. However, it should be noted that the following examples are not intended to limit the scope of the present invention thereto.

<Measurement of Characteristic Values of Ethylene-vinyl Alcohol Copolymer (A)>

(1) Ethylene Content and Degree of Saponification of Ethylene-vinyl Alcohol Copolymer (A):

The ethylene content and the degree of saponification were calculated based on the spectrum obtained by $^1$H-NMR (nuclear magnetic resonance) measurement ("JNM-GX-500 Model" manufactured by JEOL Ltd. was used for the measurement) using a deuterated dimethyl sulfoxide as a solvent.

(2) Melt Flow Rate of Ethylene-vinyl Alcohol Copolymer (A):

An ethylene-vinyl alcohol copolymer (A) as a sample was put into a cylinder having an inner diameter of 9.55 mm and a length of 162 mm of a melt indexer ("L244" manufactured by Takara Kogyo K. K.), and was molten therein at 190° C. A load was applied uniformly to the molten resin with a plunger having a weight of 2160 g and a diameter of 9.48 mm. Thus the resin was extruded through an orifice having a diameter of 2.1 mm located at the center of the cylinder. The rate (g/10 min) of the resin extruded was measured and was used as a melt flow rate. It is noted that for an ethylene-vinyl alcohol copolymer (A) having a melting point around or over 190° C., the melt flow rate is represented by extrapolation at 190° C. in a semi-logarithmic graph, measuring MFR at plural temperatures above the melting point under a load of 2160 g and plotting reciprocals of the temperatures on the abscissa and logarithms of MFR on the ordinate.

<Synthesis of Modified Ethylene-vinyl Alcohol Copolymer (C)>

Synthesis Example 1

Into a pressurizable reaction vessel, 2 parts by weight of an ethylene-vinyl alcohol copolymer (A) having an ethylene content of 44 mol %, a degree of saponification of 99.9% and an MFR (at 190° C. under a load of 2160 g) of 5.5 g/10 min and 8 parts by weight of N-methyl-2-pyrrolidone were charged, followed by heating and stirring at 120° C. for 2 hours. The ethylene-vinyl alcohol copolymer (A) was thereby dissolved completely. To the solution, 0.4 parts by weight of glycidol as an epoxy compound (B) was added, followed by heating at 160° C. for 4 hours. After the completion of the heating, the resulting solution was poured into 100 parts by weight of distilled water to coagulate. The coagulated resin was washed with a large amount of distilled water to fully remove N-methyl-2-pyrrolidone and unreacted glycidol. Thus a modified ethylene-vinyl alcohol copolymer (C) was obtained. The resulting modified ethylene-vinyl alcohol copolymer (C) was pulverized to a grain diameter of about 2 mm by a pulverizer and then washed again with a large amount of distilled water. The grains after the washing were vacuum dried at room temperature for 8 hours. The dried grains were molten at 200° C. and pelletized using a twin screw extruder.

Synthesis Example 2

Into a pressurizable reaction vessel, 2 parts by weight of an ethylene-vinyl alcohol copolymer (A) having an ethylene content of 44 mol %, a degree of saponification of 99.9% and an MFR (at 190° C. under a load of 2160 g) of 5.5 g/10 min and 8 parts by weight of N-methyl-2-pyrrolidone were charged, followed by heating and stirring at 120° C. for 2 hours. The ethylene-vinyl alcohol copolymer (A) was thereby dissolved completely. To the solution, 0.3 parts by weight of glycidol as an epoxy compound (B) was added, followed by heating at 160° C. for 4 hours. After the completion of the heating, the resulting solution was poured into 100 parts by weight of distilled water to coagulate. The coagulated resin was washed with a large amount of distilled water to fully remove N-methyl-2-pyrrolidone and unreacted glycidol. Thus a modified ethylene-vinyl alcohol copolymer (C) was obtained. The resulting modified ethylene-vinyl alcohol copolymer (C) was pulverized to a grain diameter of about 2 mm by a pulverizer and then washed again with a large amount of distilled water. The grains after the washing were vacuum dried at room temperature for 8 hours. The dried grains were molten at 200° C. and pelletized using a twin screw extruder.

Synthesis Example 3

Into a pressurizable reaction vessel, 2 parts by weight of an ethylene-vinyl alcohol copolymer (A) having an ethylene content of 44 mol %, a degree of saponification of 99.9% and an MFR (at 190° C. under a load of 2160 g) of 5.5 g/10 min and 8 parts by weight of N-methyl-2-pyrrolidone were charged, followed by heating and stirring at 120° C. for 2 hours. The ethylene-vinyl alcohol copolymer (A) was thereby dissolved completely. To the solution, 0.4 parts by weight of epoxypropane as an epoxy compound (B) was added, followed by heating at 160° C. for 4 hours. After the completion of the heating, the resulting solution was poured into 100 parts by weight of distilled water to coagulate. The coagulated resin was washed with a large amount of distilled water to fully remove N-methyl-2-pyrrolidone and unreacted epoxypropane. Thus a modified ethylene-vinyl alcohol copolymer (C) was obtained. The resulting modified ethylene-vinyl alcohol copolymer (C) was pulverized to a grain diameter of about 2 mm using a pulverizer and then washed again with a large amount of distilled water. The grains after the washing were vacuum dried at room temperature for 8 hours. The dried grains were molten at 200° C. and pelletized using a twin screw extruder.

<Preparation of a Layer of a Modified Ethylene-vinyl Alcohol Copolymer (C)>

Film 1

Using the pellet of the modified ethylene-vinyl alcohol copolymer (C) prepared in Synthesis Example 1, film formation was carried out under the extrusion conditions shown below by means of a film forming machine composed of a 40 mmφ extruder ("Plabor GT-40-A" manufactured by Research Laboratory of Plastics Technology Co., Ltd.) and a T-die. Thus, a 20 µm thick monolayer film was obtained.
  Type: Single screw extruder (non-vent type)
  L/D: 24
  Bore: 40 mmφ
  Screw: Single-thread full-flight type, nitrided surface steel
  Rotation of screw: 40 rpm
  Die: Coat hanger die of 550 mm in width
  Gap between lips: 0.3 mm
  Temperatures set for cylinders and die: C1/C2/C3/adaptor/die=180/200/210/210/210 (° C.)

Film 2

A 20 µm thick monolayer film was obtained in the same manner as that for film 1 except using the pellet of the modified ethylene-vinyl alcohol copolymer (C) obtained in Synthesis Example 2.

Film 3

A 20 µm thick monolayer film was obtained in the same manner as that for film 1 except using the pellet of the modified ethylene-vinyl alcohol copolymer (C) obtained in Synthesis Example 3.

Film 4

A 20 µm thick monolayer film was obtained in the same manner as that for film 1 except using, as a gas barrier material, an unmodified ethylene-vinyl alcohol copolymer (A) having an ethylene content of 44 mol %, a degree of saponification of 99.9% and an MFR (at 190° C. under a load of 2160 g) of 5.5 g/10 min in place of the modified ethylene-vinyl alcohol copolymer (C).

Film 5

A three-layer film (thermoplastic polyurethane layer/modified EVOH (C) layer/thermoplastic polyurethane layer) was produced under the coextrusion conditions shown below through a two-kind three-layer coextrusion machine using the modified EVOH (C) prepared in Synthesis Example 3 and a thermoplastic polyurethane ("Kuramilon 3190" manufactured by Kuraray Co., Ltd.) Both the modified EVOH (C) layer and the thermoplastic polyurethane layer are 20 µm in thickness.

The extrusion conditions are as follows.
  Layer constitution:
  Thermoplastic polyurethane/Modified EVOH (C)/Thermoplastic polyurethane (thickness: 20/20/20 in µm)
  Extrusion temperature of each resin:
  C1/C2/C3/die=170/170/220/220° C.
  Specifications of extruder for each resin:
  Thermoplastic polyurethane: 25 mmφ extruder, model "P25-18AC" (manufactured by Osaka Seiki Kousaku K. K.)
  Modified EVOH (C): 20 mmφ extruder for laboratory use, "ME type CO-EXT" (manufactured by Toyo Seiki Seisaku-Sho, Ltd.)
  Specifications of T-die: for 500 mm wide two-kind three-layer extrusion (manufactured by Research Laboratory Of Plastics Technology Co., Ltd.)
  Temperature of cooling roll: 50° C.
  Drawing speed: 4 m/min <Evaluation of a Layer of a Modified Ethylene-vinyl Alcohol Copolymer (C)>

Oxygen transmission rate and flexing resistance of films 1-5 prepared above were evaluated by the methods described below.

Measurement of Oxygen Transmission Rate:

Each of the films prepared above was conditioned at 20° C. and 65% RH for 5 days. Oxygen transmission rate of two samples taken from the film conditioned above were measured using an apparatus, "MOCON OX-TRAN 2/20" manufactured by Modern Control Inc. according to JIS K7126 (Equal Pressure Method) at 20° C. and 65% RH. The average of the measurements was calculated.

Evaluation of Flexing Resistance:

From the film prepared above, fifty films 21 cm×30 cm were cut out. Following conditioning at 20° C. and 65% RH for 5 days, every cut film was flexed 50 times, 75 times, 100 times, 125 times, 150 times, 175 times, 200 times, 225 times, 250 times, 300 times, 400 times, 500 times, 600 times, 700 times, 800 times, 1000 times, or 1500 times using a Gelbo Flex Tester manufactured by Rigaku Kogyo according to ASTM F 392-74, and then the number of pinholes was measured. For each number of flexures, measurements were conducted five times and the average thereof was used as the number of pinholes. The above measurements were plotted with numbers of flexures (P) as abscissa against numbers of pinholes (N) as ordinate. The number of flexures at which one pinhole is formed (Np1) is determined to two significant figures by extrapolation. It is noted that for a film in which no pinholes were found even after 1500 times flexure, the observation was repeated after every additional 500 times of flexure and the number of the flexures to form a pinhole was used as Np1.

The oxygen transmission rate of film 1 was $3.0 \times 10^{-13}$ $cm^3 \cdot cm/cm^2 \cdot sec \cdot cmHg$ and, therefore, the film exhibited a superior gas barrier property. In addition, the flexing resistance of film 1 was evaluated according to the above-mentioned method. As a result, Np1 of the film was 500 times and, therefore, the film exhibited an extremely superior flexing resistance.

The oxygen transmission rate of film 2 was $1.0 \times 10^{-13}$ $cm^3 \cdot cm/cm^2 \cdot sec \cdot cmHg$ and, therefore, the film exhibited a superior gas barrier property. In addition, the flexing resistance of film 2 was evaluated according to the above-mentioned method. As a result, Np1 of the film was 100 times and, therefore, the film exhibited an extremely superior flexing resistance.

The oxygen transmission rate of film 3 was $4.0 \times 10^{-13}$ $cm^3 \cdot cm/cm^2 \cdot sec \cdot cmHg$ and, therefore, the film exhibited a superior gas barrier property. In addition, the flexing resistance of film 3 was evaluated according to the above-mentioned method. As a result, Np1 of the film was 500 times and, therefore, the film exhibited an extremely superior flexing resistance.

The oxygen transmission rate of film 4 was $4.6 \times 10^{-14}$ $cm^3 \cdot cm/cm^2 \cdot sec \cdot cmHg$ and, therefore, the film exhibited a superior gas barrier property. In addition, the flexing resistance of film 4 was evaluated according to the above-mentioned method. As a result, Np1 of the film was 47 times.

The oxygen transmission rate of film 5 was $3.5 \times 10^{-13}$ $cm^3 \cdot cm/cm^2 \cdot sec \cdot cmHg$ and, therefore, the film exhibited a superior gas barrier property. In addition, the flexing resistance of film 5 was evaluated according to the above-mentioned method. As a result, Np1 of the film was 5000 times and, therefore, the film exhibited an extremely superior flexing resistance.

<Compounding of Rubber Composition and Preparations of Rubber Innerliner and Auxiliary Layer>

A rubber composition was prepared in accordance with the compounding formulation shown below. The rubber composition was subjected to vulcanization at 145° C. for 40 min and then was measured for 300% modulus by a method according to JIS K6301. Furthermore, the oxygen transmission rate thereof was measured in the same procedure as that used in the measurement of the oxygen transmission rate of the films.

Rubber composition 1 (unit: part by weight)
  Natural rubber: 30
  Br-IIR (Bromobutyl 2244 manufactured by JSR Corp.): 70
  GPF carbon black (#55 manufactured by Asahi Carbon Co., Ltd.): 60
  Sunpar 2280 (manufactured by Japan Sun Oil Co., Ltd.): 7
  Stearic acid (manufactured by Asahi Denka Co., Ltd.): 1
  Nocceler DM (manufactured by Ouchishinko Chemical Industrial Co., Ltd.): 1.3
  Zinc oxide (manufactured by Hakusui Kagaku Kogyo K. K.): 3
  Sulfur (manufactured by Karuizawa Seirensho): 0.5 300% modulus: 6.5 MPa
  Oxygen transmission rate: $6.0 \times 10^{-10}$ $cm^3 \cdot cm/cm^2 \cdot sec \cdot cmHg$ Rubber composition 2 (unit: part by weight)
  Br-IIR (Bromobutyl 2244 manufactured by JSR Corp.): 100
  GPF carbon black (#55 manufactured by Asahi Carbon Co., Ltd.): 60
  Sunpar 2280 (manufactured by Japan Sun Oil Co., Ltd.): 7
  Stearic acid (manufactured by Asahi Denka Co., Ltd.): 1
  Nocceler DM (manufactured by Ouchishinko Chemical Industrial Co., Ltd.): 1.3
  Zinc oxide (manufactured by Hakusui Kagaku Kogyo K. K.): 3
  Sulfur (manufactured by Karuizawa Seirensho): 0.5
  300% modulus: 6.0 MPa
  Oxygen transmission rate: $3.0 \times 10^{-10}$ $cm^3 \cdot cm/cm^2 \cdot sec \cdot cmHg$ <Preparation and Evaluation of a Testing Tire>

EXAMPLE 1

Figure 1:
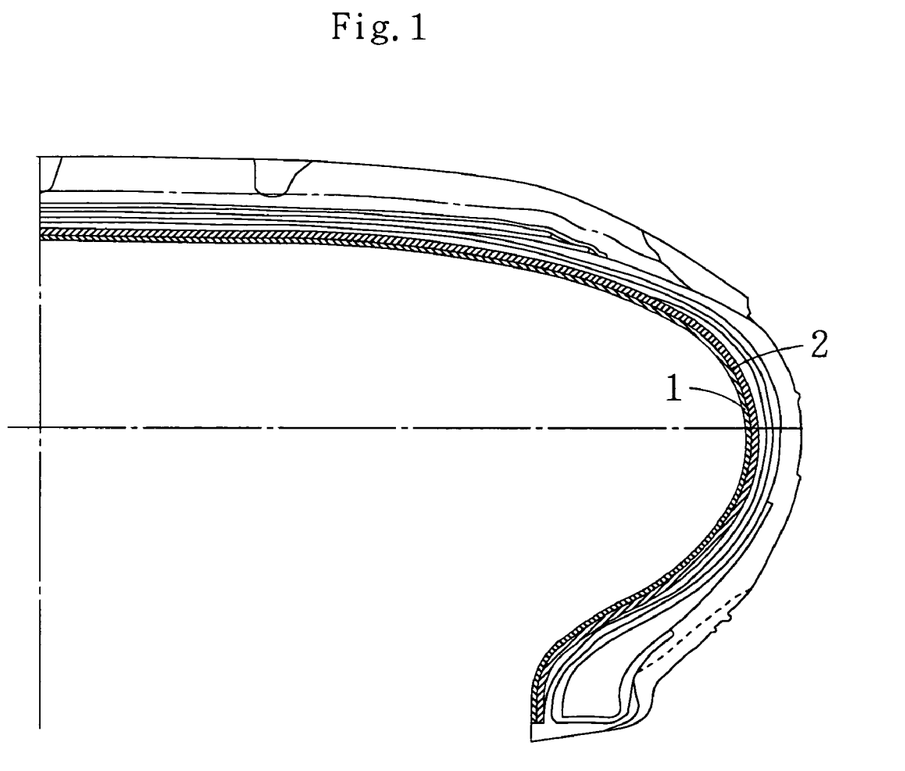
FIG. 1 is a schematic sectional view of the tire obtained in Example 1. In the FIGURE, numeral 1 denotes a layer of a modified ethylene-vinyl alcohol copolymer (C). Numeral 2 denotes an auxiliary layer (D) of an elastomer.

Using an electron beam irradiation machine "Curetron for industrial production EBC200-100" manufactured by Nissin-High Voltage Co., Ltd., film 1 was subjected to a crosslinking treatment through an electron beam irradiation under conditions including an acceleration voltage of 200 kV and an irradiation energy of 30 Mrad. The resulting film was employed as a layer of a modified ethylene-vinyl alcohol copolymer (C). Onto one side of the resulting crosslinked film, "Metaloc R30M" manufactured by Toyo Kagaku Kenkyusho Co. Ltd. was applied as an adhesive layer and then was laminated to a 500 μm thick auxiliary layer (D) using rubber composition 1 to produce an innerliner comprising the modified ethylene-vinyl alcohol copolymer (C) and the auxiliary layer (D). Using the innerliner obtained, a pneumatic tire (195/65R15) for passenger vehicles was produced in the usual method. A schematic sectional view of the resulting tire is shown in FIG. 1. In the FIGURE, numerals 1 and 2 indicate the layer of the modified ethylene-vinyl alcohol copolymer (C) and the auxiliary layer (D) of the elastomer, respectively.

The tire produced above was subjected to 10,000-km driving at a pneumatic pressure of 140 kPa while being pressed against a drum rotating at a rotation speed corresponding to a velocity of 80 km/h under a load of 6 kN. Using a tire without driving and the tire driven under the above-mentioned conditions, an internal pressure retainability was evaluated under the conditions described below. The internal pressure retainability was evaluated by installing a testing tire on a rim of 6JJ×15 followed by inflation to an internal pressure of 240 kPa and measuring an internal pressure after three months. The internal pressure retainability was expressed by an index according to the following equation:

Internal pressure retainability=$((240-b)/(240-a))\times 100$ wherein a and b are a: internal pressure after three months of a testing tire, and b: internal pressure after three months of a tire without driving described in Comparative Example 1 (a pneumatic tire using a normal rubber innerliner).

In addition, the appearance of the innerliner of the tire after the drum driving was observed visually to evaluate the presence of cracks. The evaluation results are shown in Table 1.

EXAMPLE 2

An innerliner and a pneumatic tire for passenger vehicles were produced in the same manner as Example 1 except changing the thickness of the auxiliary layer using rubber composition 1 to 1000 μm. The internal pressure retainability and the appearance of the innerliner of the tire after drum driving were evaluated. The evaluation results are shown in Table 1.

EXAMPLE 3

An innerliner and a pneumatic tire for passenger vehicles were produced in the same manner as Example 1 except using film 2 in place of film 1. The internal pressure retainability and the appearance of the innerliner of the tire after drum driving were evaluated. The evaluation results are shown in Table 1.

EXAMPLE 4

An innerliner and a pneumatic tire for passenger vehicles were produced in the same manner as Example 1 except using film 3 in place of film 1. The internal pressure retainability and the appearance of the innerliner of the tire after drum driving were evaluated. The evaluation results are shown in Table 1.

EXAMPLE 5

An innerliner and a pneumatic tire for passenger vehicles were produced in the same manner as Example 1 except using film 5 in place of film 1. The internal pressure retainability and the appearance of the innerliner of the tire after drum driving were evaluated. The evaluation results are shown in Table 1.

EXAMPLE 6

Using an electron beam irradiation machine "Curetron for industrial production EBC200-100" manufactured by Nissin-High Voltage Co., Ltd., film 1 was subjected to a crosslinking treatment through an electron beam irradiation under conditions including an acceleration voltage of 200 kV and an irradiation energy of 30 Mrad. The resulting film was employed as a layer of a modified ethylene-vinyl alcohol copolymer (C). The resulting crosslinked film was coated on its one side with "Metaloc R30M" manufactured by Toyo Kagaku Kenkyusho Co. Ltd. as an adhesive layer. Using the coated film directly as an innerliner without further laminating any auxiliary layer of a rubber composition, a pneumatic tire (195/65R15) for passenger vehicles was produced by the usual method. The tire obtained was evaluated for the internal pressure retainability and the appearance of the innerliner after drum driving in the same manner as Example 1. The evaluation results are shown in Table 1.

COMPARATIVE EXAMPLE 1

Employing a 1500 μm thick innerliner using therein rubber composition 2 which is employed as a normal rubber innerliner, a pneumatic tire (195/65R15) for passenger vehicles having no layer of a modified ethylene-vinyl alcohol copolymers (C) was produced by the usual method like above. The tire obtained was evaluated for the internal pressure retainability and the appearance of the innerliner after drum driving in the same manner as Example 1. The evaluation results are shown in Table 1.

COMPARATIVE EXAMPLE 2

A crosslinking treatment was applied to film 4 by irradiating the film with electron beams under conditions including an acceleration voltage of 200 kV and an irradiation energy of 30 Mrad. The resulting film was used as a layer of an unmodified ethylene-vinyl alcohol copolymer (A). The resulting crosslinked film was coated on its one side with "Metaloc R30M" manufactured by Toyo Kagaku Kenkyusho Co. Ltd. as an adhesive layer. Using the coated film directly as an innerliner without further laminating any auxiliary layer of a rubber composition, a pneumatic tire (195/65R15) for passenger vehicles was produced by the usual method. The tire obtained was evaluated for the internal pressure retainability and the appearance of the innerliner after drum driving in the same manner as Example 1. The evaluation results are shown in Table 1.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Kind of film | | Film 1 | Film 1 | Film 2 | Film 3 | Film 5 | Film 1 | | Film 4 |
| Auxiliary layer (rubber composition 1) Thickness (μm) | | 500 | 1000 | 500 | 500 | 500 | | | |
| Internal pressure retainability (index) | Tire before driving | 950 | 1086 | 950 | 900 | 1120 | 844 | 100 | 1267 |
| | Tire after driving | 950 | 1086 | 844 | 900 | 1120 | 691 | 100 | 292 |
| Appearance after driving | | No cracks | No cracks | No cracks | No cracks | No cracks | No cracks | No cracks | Some cracks |

The results in Table 1 show that the pneumatic tires of Examples 1-5 using the innerliners of a modified ethylene-vinyl alcohol copolymer (C) have internal pressure retainabilities better than that of the pneumatic tire of Comparative Example 1 using a normal rubber innerliner not only before driving but also after a 10,000 km drum driving. In addition, it is clear that the tires of the Examples have good fatigue resistances because no cracks were formed in the evaluations of the appearance of the innerliners after drum driving. On the other hand, it is also shown that although the pneumatic tire of Comparative Example 2 using the unmodified ethylene-vinyl alcohol copolymers (A) has a good internal pressure retainability before driving, cracks were formed in the innerliner after drum driving and the internal pressure retainability was extremely reduced after the driving.

What is claimed is:

1. A pneumatic tire comprising an innerliner which comprises a layer comprising a modified ethylene-vinyl alcohol copolymer (C) obtained by reacting 1-50 parts by weight of a monofunctional epoxy compound (B) with 100 parts by weight of an ethylene-vinyl alcohol copolymer (A) having an ethylene content of 25-50 mol %, wherein the modified ethylene-vinyl alcohol copolymer (C) is crosslinked by irradiation with an energy ray.

2. The pneumatic tire according to claim 1, wherein the ethylene-vinyl alcohol copolymer (A) has a degree of saponification of 90% or more.

3. The pneumatic tire according to claim 1, wherein the layer of the modified ethylene-vinyl alcohol copolymer (C) has an oxygen transmission rate at 20° C. and at 65% RH of $3.0 \times 10^{-12}$ $cm^3 \cdot cm/cm^2 \cdot sec \cdot cmHg$ or less.

4. The pneumatic tire according to claim 1, wherein the thickness of the layer of the modified ethylene-vinyl alcohol copolymer (C) is 50 μm or less.

5. A pneumatic tire comprising an innerliner which comprises a layer comprising a modified ethylene-vinyl alcohol copolymer (C) obtained by reacting 1-50 parts by weight of a monofunctional epoxy compound (B) with 100 parts by weight of an ethylene-vinyl alcohol copolymer (A) having an ethylene content of 25-50 mol %, and further comprises an auxiliary layer (D) of an elastomer adjacent to the layer of the modified ethylene-vinyl alcohol copolymer (C), wherein the modified ethylene-vinyl alcohol copolymer (C) is crosslinked by irradiation with an energy ray.

6. The pneumatic tire according to claim 5, wherein the auxiliary layer (D) has an oxygen transmission rate at 20° C. and at 65% RH of $3.0 \times 10^{-9}$ $cm^3 \cdot cm/cm^2 \cdot sec \cdot cmHg$ or less.

7. The pneumatic tire according to claim 5, wherein a butyl rubber or a halogenated butyl rubber is used in the auxiliary layer (D).

8. The pneumatic tire according to claim 5, wherein a diene-based elastomer is used in the auxiliary layer (D).

9. The pneumatic tire according to claim 5, wherein the auxiliary layer (D) has a thickness of 50-1500 μm in total.

10. A pneumatic tire comprising an innerliner which comprises a layer comprising a modified ethylene-vinyl alcohol copolymer (C) obtained by reacting 1-50 parts by weight of a monofunctional epoxy compound (B) with 100 parts by weight of an ethylene-vinyl alcohol copolymer (A) having an ethylene content of 25-50 mol %, and further comprises an auxiliary layer (D) of an elastomer adjacent to the layer of the modified ethylene-vinyl alcohol copolymer (C), wherein the layer of the modified ethylene-vinyl alcohol copolymer (C) is laminated with the auxiliary layer (D) through at least one adhesive layer, wherein the modified ethylene-vinyl alcohol copolymer (C) is crosslinked by irradiation with an energy ray.

11. The pneumatic tire according to claim 10, wherein the auxiliary layer (D) is designed so that in a region from the end of each belt to a bead portion, a portion of the auxiliary layer (D) corresponding to a width of at least 30 mm in the radius direction is thicker by at least 0.2 mm than a portion of the auxiliary layer (D) corresponding to a portion of the auxiliary layer (D) under the belt.

* * * * *